US006083145A

United States Patent [19]

Azema

[11] Patent Number: 6,083,145

[45] Date of Patent: Jul. 4, 2000

[54] DEVICE FOR HANDLING AN ELECTRIC SPINDLE OF A HIGH-SPEED MACHINE TOOL

[75] Inventor: Andre Azema, Saix, France

[73] Assignee: Renault Automation, Boulogne-Billancourt, France

[21] Appl. No.: 09/147,024

[22] PCT Filed: Mar. 14, 1997

[86] PCT No.: PCT/FR97/00462

§ 371 Date: Nov. 27, 1998

§ 102(e) Date: Nov. 27, 1998

[87] PCT Pub. No.: WO97/33826

PCT Pub. Date: Sep. 18, 1997

[30] Foreign Application Priority Data

Mar. 14, 1996 [FR] France .................................. 96 03424

[51] Int. Cl.$^{7}$ ............................. B23Q 3/157; B23C 9/00

[52] U.S. Cl. .......................... 483/32; 29/726.5; 409/231; 483/13

[58] Field of Search ............................. 29/726.5; 483/30, 483/13, 31, 32; 414/745.3, 726.5, 495; 409/231

[56] References Cited

U.S. PATENT DOCUMENTS

| | | | |
|---|---|---|---|
| 3,239,077 | 3/1966 | Huff et al. . | |
| 3,836,015 | 9/1974 | Travis | 29/726.5 |
| 3,935,951 | 2/1976 | Claus et al. | 29/726.5 |
| 4,688,838 | 8/1987 | Skillman | 294/67.5 |
| 4,815,903 | 3/1989 | Skidmore, Sr. | 409/31 |
| 4,944,638 | 7/1990 | Brohammer | 409/231 X |
| 5,322,410 | 6/1994 | Persinger et al. | 29/726.5 X |

FOREIGN PATENT DOCUMENTS 295187 12/1953 Switzerland .

*Primary Examiner*—William Briggs
*Attorney, Agent, or Firm*—Oblon, Spivak, McClelland, Maier & Neustadt, P.C.

[57] ABSTRACT

A handling device for a cylindrical electric tool holder spindle. The device includes a handling cradle including a combination of a receptacle in which the electric spindle is placed, a gripping member for lifting the handling cradle and a fastening member for fastening the cradle to the holder so that the electric spindle is held in place relative to the holder. The fastening member is arranged in front of the handling cradle and includes a cylindrical tube cut along a horizontal plane and having an outer diameter matching the inner diameter of the cylindrical holder so that it is coaxial therewith. It also has an inner diameter greater than the diameter of the rear body of the electric spindle. The device may be used for maintaining machine tools.

20 Claims, 5 Drawing Sheets

DEVICE FOR HANDLING AN ELECTRIC SPINDLE OF A HIGH-SPEED MACHINE TOOL

BACKGROUND OF THE INVENTION

1. Field of the Invention

The present invention relates to the field of machine tools and more particularly to modifications with which handling, in particular coupling as well as mounting and demounting of a tool-carriage electric spindle of a machine tool for high-speed machining can be achieved under the best conditions.

2. Discussion of the Background

High-speed machining of parts in a machine tool generally takes place by means of a tool driven rotationally by the motor shaft of an electric spindle installed in a slide, which itself is mounted to be movable by translation along three axes X, Y and Z.

A machine tool classically has three main working stations, to wit:

- a machining station proper, provided with the tool driven rotationally by the motor shaft of the electric spindle and shaping the part to be machined,
- a drive station situated upstream from the machining station and comprising an assembly of mechanisms that in particular ensure the translational displacements of the slide of the electric spindle along the X, Y and Z axes, as well as the supply of power to the electric spindle for rotation of its tool-carriage shaft,
- and a control station cooperating with the drive station and as a function of a program of instructions preestablished to take charge of the different phases of machining of the said part.

The powers required of electric spindles during high-speed machining are such that they are of large dimensions and can reach masses as heavy as sixty kilograms. The exterior surface of these electric spindles is formed classically by a cylinder provided with a shoulder situated at the front thereof to permit fixation of the electric spindle in the slide, as well as of a projecting or non-projecting motor shaft providing drive for the tools. These electric spindles are of large dimensions and masses, and so the operations of handling them are difficult.

In fact, coupling of an electric spindle having the characteristics cited in the foregoing is achieved by positioning the rear end thereof to face the slide in order to be able to connect and couple, via supply connectors disposed on the rear end of the electric spindle, the cables located inside the slide and necessary for operation of the electric spindle. Holding in this position is indispensable for connection of all cables. This holding operation is made difficult by the high position of the slide, relative to the floor, at which the electric spindle must be held in facing relationship.

SUMMARY OF THE INVENTION

The invention relates more particularly to mounting of the electric spindle in the slide, which is performed after coupling and comprises inserting the rear body of the electric spindle in a slide such as that already described by the Applicant in French Patent Application No. 9600912. This slide is formed in particular by three successive recessed shoulders forming collars, the first exterior shoulder situated at the entrance to the slide defining an opening diameter larger than the opening diameter of the other two intermediate and interior shoulders. Thus, during mounting of the electric spindle, the rear body thereof comes into contact with the two intermediate and interior shoulders, which are provided with sealing elements in order to create a leaktight chamber to be filled with oil or any other interposed material capable of damping the vibrations due to high-speed machining. The fixation of the electric spindle in the slide is achieved by causing the rear face of the shoulder of the electric spindle to abut against the intermediate shoulder of the slide, said rear face being held in position by a flange fixed by means of bolts passed therethrough and engaging with the first exterior shoulder of the slide.

The operation of inserting the said rear body in the slide is tricky, because it necessitates great precision in order to avoid any damage to the said sealing elements, which in turn would present the risks of leakage and therefore lower efficiency of vibrational damping and the possibility of accident due to the presence of the electrical connections necessary for operation of the electric spindle. This precision is difficult to achieve by virtue of the weight and volume of the electric spindle, which must be held in raised position facing the slide during the service operations of the maintenance team.

In addition, during the demounting operation, the rear body of the electric spindle becomes slippery because of the fact of its contact with the said oil or intermediate material, thus making handling of the electric spindle dangerous.

U.S. Pat. No. 3,239,077 filed in the name of O. C. Huff and Norman C. Stanley describes an apparatus for handling a heat-exchanger tube bundle. This apparatus comprises:

- a support bed for receiving the tube bundle,
- a carriage for moving the tube bundle in order to introduce it into or pull it out of its shell,
- a mechanism for fixing or at least positioning the said support bed on the said shell,
- and cable gripping points permitting lifting of the said support bed by a crane or any other lifting means.

The support bed comprises a carriage which, receiving the said tube bundle, is displaced along a rolling track comprising two guide rails attached to the said shell by one of their ends, by means of a fastening device with which the said rolling track can be made integral with the said shell. This device for fastening the rolling track to the shell comprises a locking means capable of clamping onto the thickness of a flange exterior to the shell and drilled with transverse holes in which centering pins penetrate in such a way as to position the shaft of the rolling track and consequently the axis of the carriage and of the tube bundle carried thereby correctly relative to the shaft of the shell. The fastening device is therefore preformed such that it can be fixed on the exterior of the shell, which is preformed for this purpose by a flange constructed peripherally around the housing. It is to be noted that the tube bundle is also provided with an exterior flange to be applied against the exterior flange of the housing support when the tube bundle is engaged in the housing support.

Starting from this situation, the Applicant conceived an original design of an assembly comprising a handling device, a tool-carriage cylindrical electric spindle and a cylindrical support of the slide type of a machine tool for high-speed machining in order to obviate the said disadvantages for coupling as well as for mounting and demounting the electric spindle in the slide by providing, at the same height and facing said slide, a fixed working plane for coupling of the electric spindle and the operations of handling it, while ensuring precise insertion of the electric spindle in the slide.

To achieve this, the assembly of the invention is of the type in which the device for handling a tool-carriage cylindrical electric spindle in a cylindrical support of the slide type of a machine tool for high-speed machining comprises a handling cradle formed by the combination of:

- a support bed in which the electric spindle is positioned,
- a gripping means to ensure lifting of the said handling cradle,
- and a mechanism for fixing the cradle to the slide.

According to the invention, this assembly is remarkable in that the mechanism for fixing the handling cradle is situated at the front end thereof and comprises a cylindrical tube cut according to a horizontal plane and having its outside diameter matched to the diameter of the first interior cylinder of the slide so as to be coaxial therewith, and having an inside diameter larger than the diameter of the rear body of the electric spindle. The fixation device can therefore be integrated into the interior of the support in such a way that its inside diameter fits in the extension of the outside diameter of the electric spindle, which slides on the said fixation mechanism, whereas in the cited U.S. Patent the fixation device is made integral with the flange situated on the exterior of the shell to enable passage of the carriage, the platform of which is situated at the level of the exterior cylinder of the tube bundle to ensure removal of the said bundle from or engagement thereof in the shell under the effect of displacements of the carriage. In the U.S. Patent, the tube bundle is displaced by a carriage which carries it and which moves above a track fixed at one end to the shell at the level of its exterior flange and, in the invention, the fixation mechanism is disposed inside the shell and itself comprises the track for displacement of the electric spindle. This has the advantage of positioning the cradle relative to the slide by a cylindrical centering means while permitting the fixation mechanism to form a slideway with the slide, thus ensuring coaxiality between the slide and the fixation mechanism. Another advantage of this disposition is the possibility of making the electric spindle slide in the interior cylinder of the fixation mechanism by virtue of the larger diameter thereof.

The combination itself has numerous advantages, including:

- placing the electric spindle on a stable support,
- permitting the electric spindle to slide from the cradle toward the slide,
- ensuring that the electric spindle is held in position at the height of the slide and facing it,
- permitting the operations of placing and depositing the electric spindle toward the slide,
- ensuring a stable working plane for servicing operations on the electric spindle.

This fixation mechanism is fixed by means of two bolts passing through it and engaging in holes drilled in the first exterior recessed shoulder of the slide, thus using the fixation support of the flange to hold the shoulder of the electric spindle abuttingly against the intermediate recessed shoulder of the slide. Advantageously, the same holes drilled in the fixation support will be usable to fix the fixation mechanism. In addition, this fixation mechanism is disposed in such a way relative to the support bed that the electric spindle, when horizontal on its support, is coaxial with the fixation mechanism.

According to particularly advantageous characteristics of the invention, the support bed is provided on its median longitudinal axis with an adjusting shim, on which there slides the electric spindle, permitting horizontal movement of the electric spindle toward the slide while balancing the electric spindle, which is inclined because its shoulder is in contact with the edges of the support bed. Another advantage of this adjusting shim, which is situated close to the fixation mechanism, is that the electric spindle cannot come into contact with the interior cylinder of the fixation mechanism during sliding thereof from the support bed toward the slide, thus preventing possible scratch marks from being formed on the body of the electric spindle by the friction between the body of the electric spindle and the interior cylinder of the said fixation mechanism. In addition, in a particularly advantageous embodiment, the adjusting shim is situated on the support bed in such a way that, during sliding of the electric spindle toward the slide for insertion purposes, the shoulder of the electric spindle become abutted against the shim as soon as the rear body of the electric spindle is carried by the two interior and intermediate shoulders of the slide, thus permitting demounting and release of the handling cradle in order to terminate the mounting phase by causing the rear face of the shoulder of the electric spindle to become abutted against the intermediate shoulder of the slide and to be held in position by means of the flange that is fixed by bolts to threaded holes, which are situated on the first exterior recessed shoulder of the slide and cleared by removal of the fixation mechanism. This last operation is possible only if the fixation mechanism is demounted from the first exterior recessed shoulder of the slide.

According to another characteristic of the invention, the said support bed is provided with a device for axial blocking of the said electric spindle in the said support bed in order to prevent translational movement of the electric spindle along its axis. This characteristic is particularly advantageous, because displacement of the handling cradle can be ensured without the risk that it will slip on its translation axis inside the said cradle.

According to another characteristic of the invention, the gripping means is provided with a shackle situated at the level of the center of gravity of the handling cradle and situated on one of its sides, in such a way as to leave one side unencumbered so that the electric spindle can be placed and/or displaced in the cradle from one side. This shackle has the advantage that it permits the handling cradle to be raised by any desired lifting means from the place in which it is stored toward the front of the slide without lack of balance that could hamper fixation thereof on the slide in order to provide the handler with a working plane for mounting or demounting of the electric spindle. For the mounting operation, it will be possible to place the electric spindle in the support bed before or after the cradle is fixed to the slide.

The electric spindle is therefore placed on a handling cradle which, by virtue of its gripping means, can be raised by any desired lifting means to the height at which the slide is situated and, by virtue of its fixation mechanism, can be held in horizontal position facing the slide, thus facilitating the connections and couplings of the electric spindle and precise insertion in the slide by virtue of the horizontal position of the electric spindle and its coaxiality with the slide, thus avoiding potential damage to the sealing elements situated on the two interior and intermediate shoulders of the slide. This handling cradle will also have the advantage that it permits demounting of the electric spindle without difficulty due to its contact with the oil, by virtue of the fact that it defines a support bed in which the electric spindle can be placed without having to be carried by the handler.

BRIEF DESCRIPTION OF THE DRAWINGS

Although the main aspects of the invention considered to be novel have been expressed hereinabove, more ample details concerning a preferred embodiment of an assembly for handling an electric spindle of a machine tool for high-speed machining in conformity with the fundamental concepts of the invention will be better understood by referring to the description hereinafter and to the accompanying drawings illustrating this embodiment, wherein.

DETAILED DESCRIPTION OF THE PREFERRED EMBODIMENTS

Figure 1:
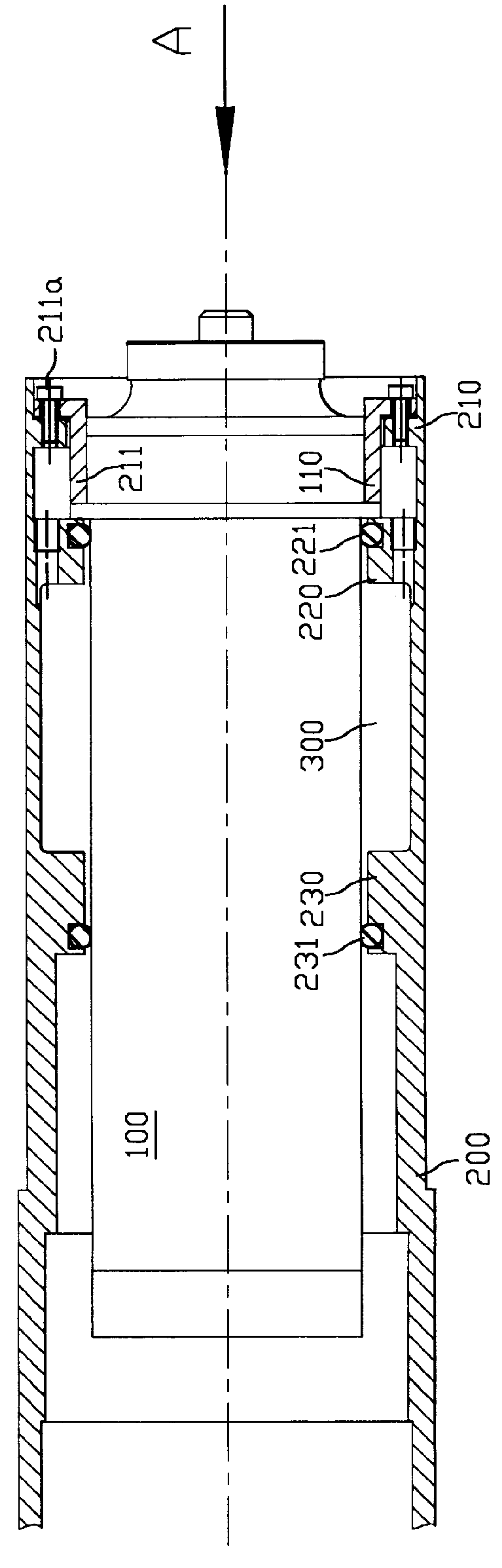
FIG. 1 is a sectional view in a plane passing through the axis of the slide of the assembly comprising slide and electric spindle.

The purpose of the drawing of FIG. 1 is to illustrate the mounting of an electric spindle denoted by 100 as a whole in an electric-spindle carriage slide denoted by 200 as a whole, achieved by cylindrical penetration of the said electric spindle into the slide in the direction of arrow A. The slide 200 is formed by three successive recessed shoulders forming collars, the first exterior shoulder 210 situated at the entrance to the slide defining an opening diameter larger than the opening diameter of the other two intermediate and interior shoulders 220 and 230. The rear body of the electric spindle 100 is brought into contact with the sealing elements 221 and 231 situated respectively on the intermediate and interior recessed shoulders 220 and 230 respectively to define a sealed chamber 300 filled with oil. The rear face of the shoulder 110 of the electric spindle 100 becomes abutted against the front face of the intermediate recessed shoulder 220, whereupon the electric spindle 100 is held in position in the slide 200 by means of a flange 211 which, since it bears on the front face of the shoulder 110 of the electric spindle 100, is fixed by screws 211*a* passing therethrough and engaging in threaded holes 212 drilled through the first recessed shoulder 210 from one side to the other.

Figure 2:
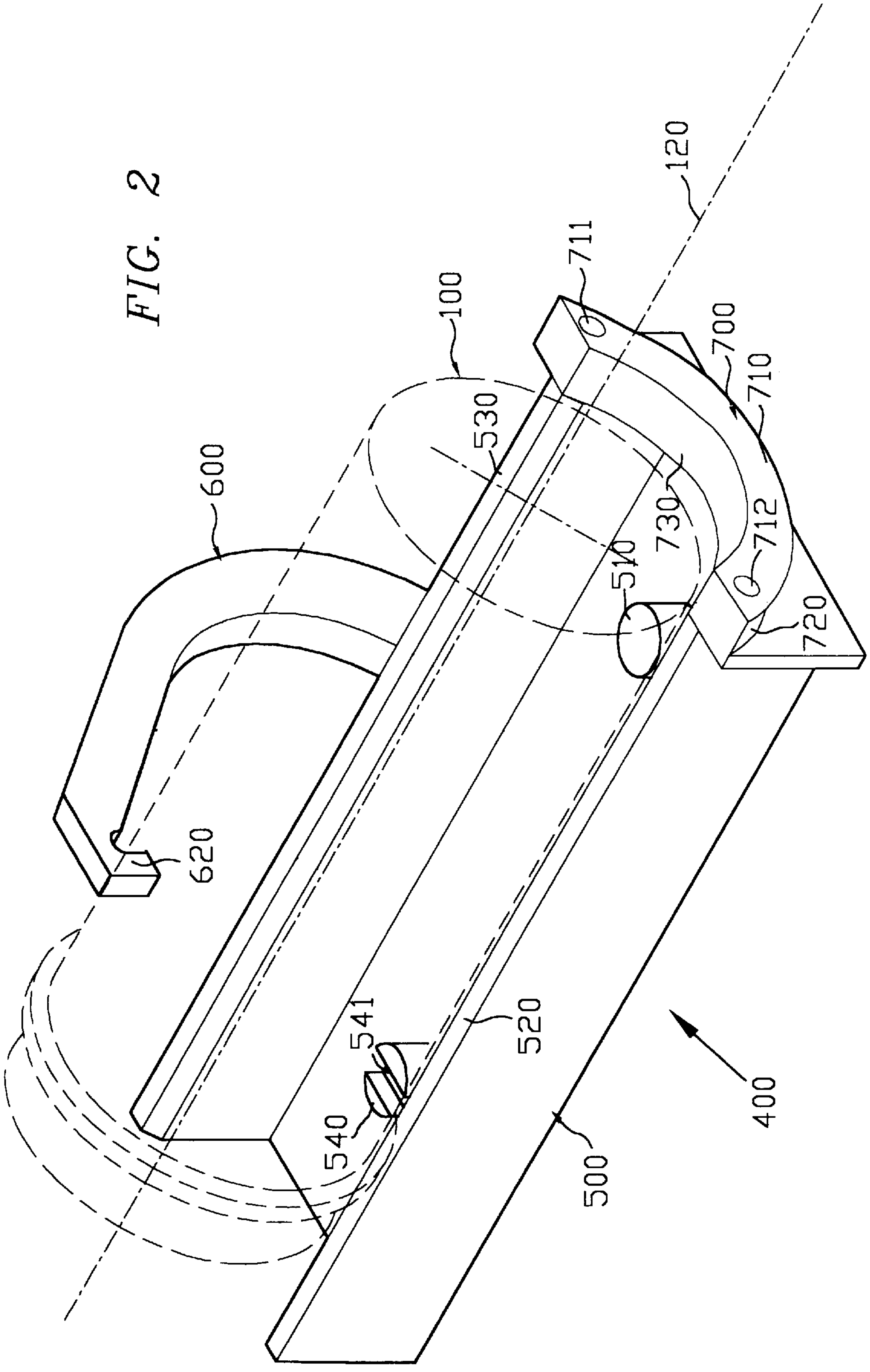
FIG. 2 is a perspective view of the handling cradle in which there is placed the electric spindle, outlined as dotted lines.

As shown in the drawing of FIG. 2, the handling cradle of the invention denoted by 400 as a whole comprises a support bed 500 on which the electric spindle 100 is placed, a shackle 600 acting as gripping means and a fixation mechanism 700 to ensure that the cradle is held on the slide.

According to the invention, the said fixation mechanism 700 is formed by a cylindrical tube 710 cut through a horizontal plane situated below the axis of symmetry 120 of the electric spindle. This cut cylindrical tube 710 is dimensioned such that its outside diameter 720 matches the first interior cylinder 240 of the slide 200, allowing the fixation mechanism 700 to be coaxial with the slide 200, and such that its inside diameter 730 is larger than the diameter of the rear body of the electric spindle 100. The said cut tube 710 is provided with two orifices 711 and 712 drilled in its thickness with axes parallel to its axis. Thus, during fixation of the cradle 400 on the slide 200, the said cut tube 710 is inserted in the first interior cylinder 240 of the slide along the axis thereof. The two orifices 711 and 712 are disposed such that, when the fixation mechanism 700 is inserted in the slide 200, they are each coaxial with one of the threaded holes 212 drilled in the thickness of the shoulder 210 of the slide 200. Via these orifices, bolts (not shown) can fix the fixation mechanism 700 of the cradle 200 to the slide 200 by engaging in the threaded holes 212, thus permitting the means for fixation of the electric spindle 100 to be used as support for fixation of the cradle 400 to the slide 200.

The support bed 500 of the cradle 400 on which the electric spindle 100 is deposited is formed from a channel iron in which there is housed a shim 510 situated in the interior thereof. The electric spindle 100 is thus in contact at two points of its front end with the edges 520 and 530 of the channel iron 500 via its shoulder 110, and is in contact at one point of its rear end with the shim 510 directly via its rear body. According to a particularly advantageous characteristic of the invention, the edges 520 and 530 of the said channel iron are chamfered in order to avoid scratches, which are potential consequences of slipping of the shoulder 110 of the electric spindle 100 over the edges 520 and 530 of the channel iron and in order to permit better seating of the electric spindle 100 in the support bed 500. According to another advantageous characteristics of the invention, the said shim 510 is situated in the longitudinal plane of symmetry of the channel iron 500 and has a height such that it holds the electric spindle 100 in horizontal position facing the slide 200. This shim 510 thus permits horizontal sliding of the electric spindle 100 of the cradle 400 toward the slide 200, thus ensuring precise insertion of the rear body of the electric spindle 100 in the two intermediate and interior shoulders 220 and 230 respectively of the slide 200 provided with sealing elements 221 and 231, which necessitate great precision in mounting the electric spindle 100 in the slide 200. In addition, because the said shim 510 slides without coming into contact with the fixation mechanism, there are no risks of scratching of the rear body of the electric spindle 100, in which case leaktightness of the assembly comprising electric spindle and slide and thus vibrational damping could no longer be guaranteed. On the other hand, the entire said adjusting shim 510 or only the part thereof in contact with the body of the electric spindle 100 is of "nylon" material, in order to avoid any risk of scratching during sliding of the electric spindle thereover.

Figure 3:
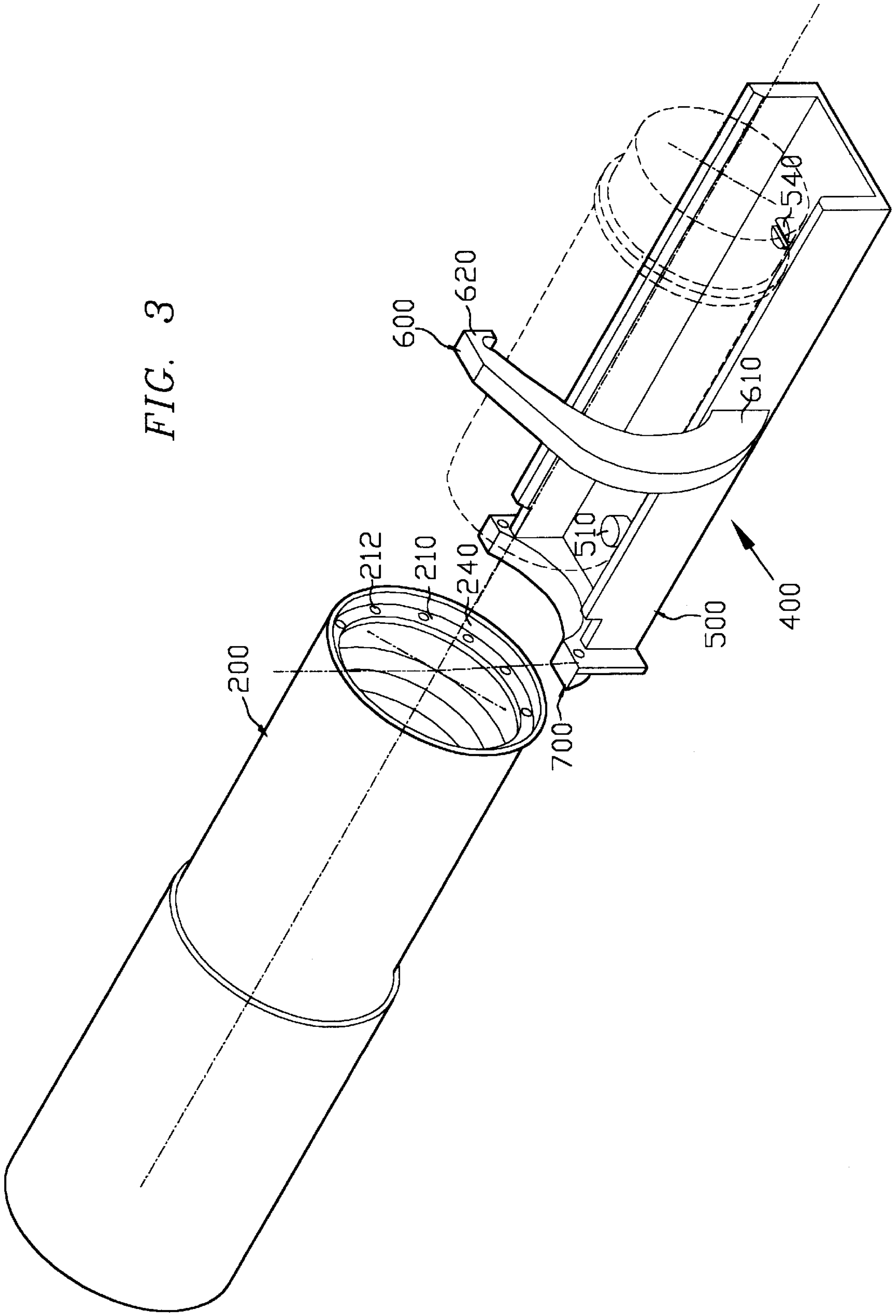
FIG. 3 is a perspective view of the handling cradle facing the slide and carrying the electric spindle.

As illustrated in FIG. 3, the gripping means 600 comprises a shackle, one end 610 of which is situated on one of the sides of the support bed 500 and the other end 620 of which is preformed to receive the hooking means 800 (see FIGS. 4*a*, 4*b*, 4*c*) of a lifting machine. This shackle 600 has the advantage of ensuring engagement with the cradle 400 to bring it by means of a lifting machine such as a block and tackle to the height of the slide 200, to position it facing said slide in order to fix it, and to lighten the load disposed at the end of the slide by dispensing with the use of scaffolding during mounting and/or demounting operations. The said shackle 600 is advantageously disposed at the level of the center of gravity of the support bed 500, and so balancing of the entire cradle 400 while it is being turned relative to the turning mechanism 800 on the hook of the lifting machine is achieved by virtue of its weight, which ensures its positioning relative to the vertical and therefore relative to the slide 200.

Figure 4:
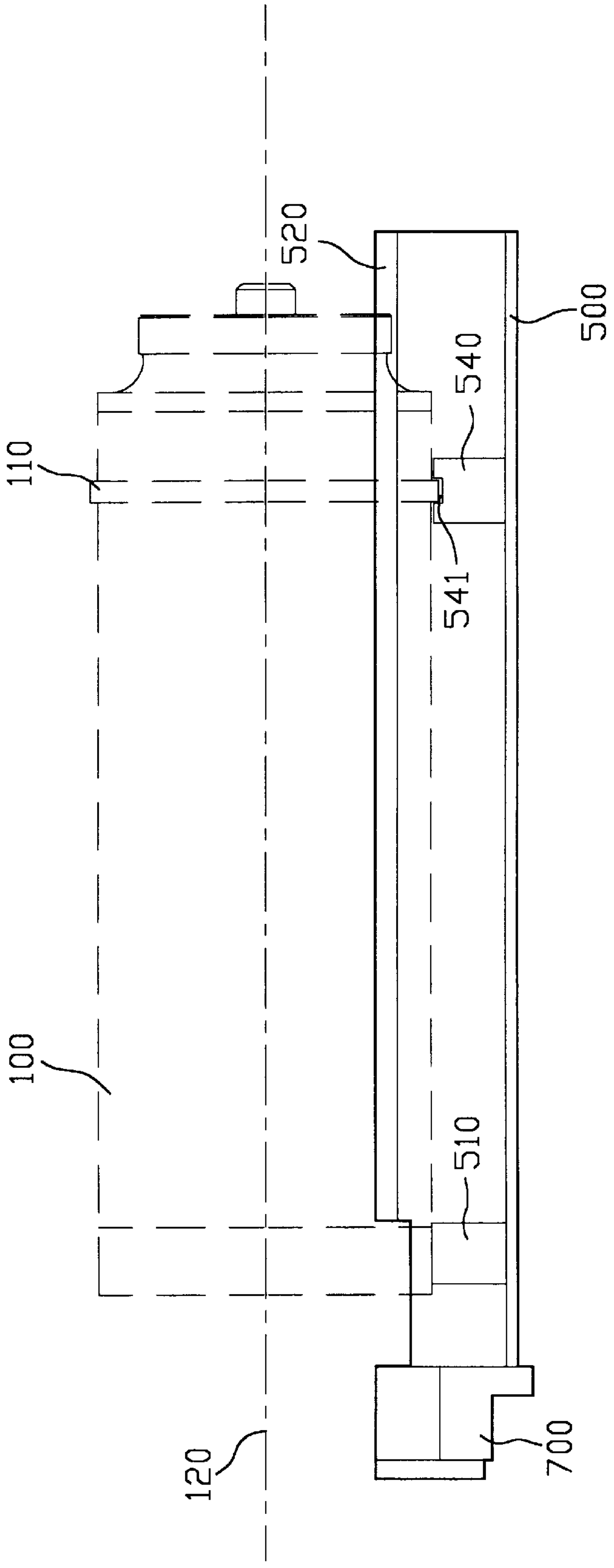
FIG. 4 is a sectional view, in the vertical plane passing through the axis, of the electric spindle of the handling cradle carrying the electric spindle.

As illustrated in FIG. 4, the said support bed 500 is provided with a shim 540 for axial blocking of the said electric spindle 100 in the said support bed 500, thus preventing translational movement of the electric spindle 100 along its axis 120. This arrangement is particularly advantageous, because it is possible during handling of the electric spindle 100 to prevent any translation and therefore sliding of the electric spindle 100 in the interior of the cradle 400, which would accentuate the risk of scratching as well as the risk of dropping of the electric spindle 100.

According to a preferred embodiment of the invention, the blocking device comprises a groove 541 cut in the said axial blocking shim 540 perpendicular to the axis 120 of the said electric spindle 100. Advantageously, and as illustrated, the said groove 541 has a width suitable for accommodating the said shoulder 110 of the electric spindle 100 and a depth such that the said shoulder 110 can remain in contact with the chamfered edges 520 and 530 of the said support bed 500. Thus three-point contact is maintained between the electric spindle and the support bed, and is not subject to interference by this axial blocking shim 540, whose function is to prevent sliding of the body of the electric spindle 100. In addition, this axial blocking shim 540 is situated on the median longitudinal axis of the support bed 500 such that, when the said shoulder 110 of the electric spindle 100 is engaged in the said groove 541, the rear body of the electric spindle 100 bears on the said adjusting shim 510 without being inserted in the said support 200.

Another advantage of the presence of this blocking shim is that it makes the operations of insertion and withdrawal of the electric spindle more difficult. In fact, this additional obstacle forces the handler to raise the electric spindle 100 slightly to the level of its shoulder 110 during insertion, in order to disengage it from the blocking shim 540 then to replace it after slight sliding and thereafter to begin a sliding movement along the axis 120 for the purposes of inserting it in the interior of the slide. This fragmentation of the insertion movements slows the placement of the electric spindle but permits the handler to take all precautions necessary for manipulation thereof.

Figure 5A:
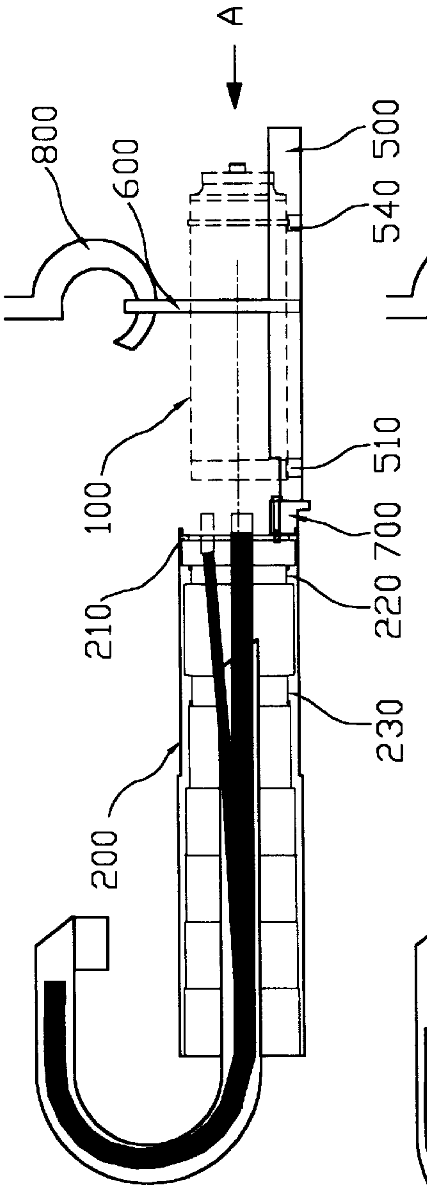
FIGS. 5*a*, 5*b* and 5*c* respectively illustrate the phases of mounting of the electric spindle in the slide.
Figure 5B:
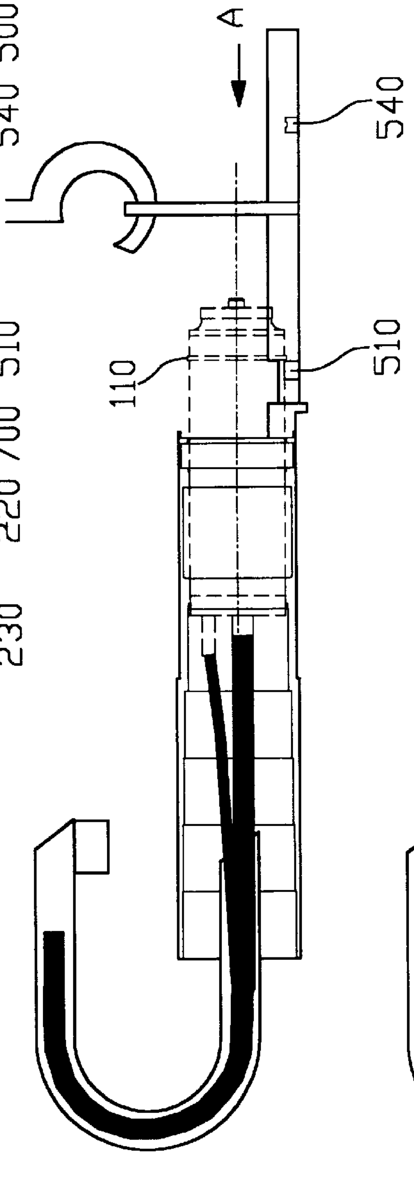
Figure 5C:
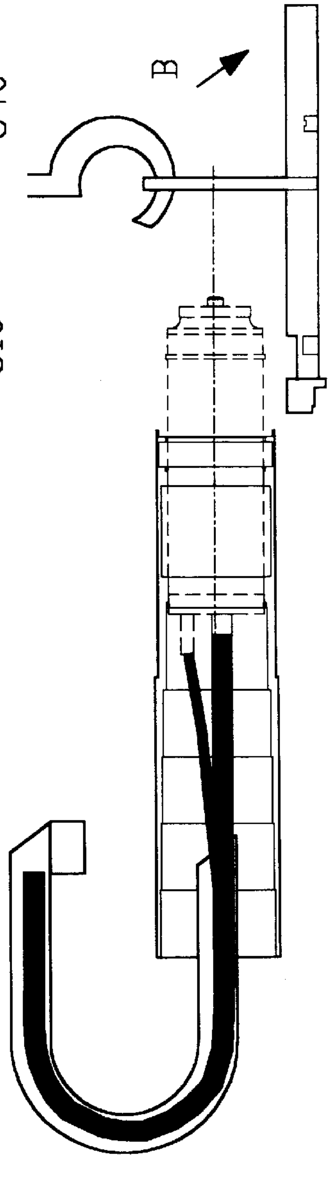

The drawings of FIGS. 5*a*, 5*b* and 5*c* illustrate the phases of mounting of an electric spindle 100 in a slide 200 by means of the handling cradle 400 described hereinabove.

As illustrated in the drawing of FIG. 5*a*, the electric spindle 100 is placed in the cradle 400, which has been brought beforehand to the height of and facing the slide 200 and fixed via its fixation mechanism 700 on the first recessed exterior shoulder 210 of the slide 200 by means of bolts as described hereinabove. This cradle 400 makes it possible to create, in front and at the height of the slide 200, a fixed horizontal working plane to facilitate connecting the cables and wires disposed in the interior and at the rear of the slide 200 and necessary for operation of the electric spindle 100. During displacement of the cradle 400, the shoulder 110 of the electric spindle 100 is engaged in the blocking shim 540 until that position is reached.

As shown in FIG. 5*b*, the shim 510 is situated on the support bed 500 such that, during sliding (arrow A) of the electric spindle 100 (achieved after disengagement of the shoulder 110 of the electric spindle 100 from the groove 541 of the shim 540) toward the slide 200 and insertion thereof, the shoulder 110 of the electric spindle 100 becomes abutted against the shim 510 as soon as the rear body of the electric spindle 100 is carried by the two interior and intermediate shoulders 230 and 220 respectively of the slide 200. During this abutting relationship, the electric spindle 100 is therefore carried by the two shoulders 230 and 220, and can be released from the cradle 400. The bolts are then removed from the first exterior recessed shoulder 210 of the slide 200, the fixation mechanism 700 is unclamped from the slide 200 and the cradle 400 can be disengaged therefrom as shown by arrow B of FIG. 5*c*.

What is claimed is:

1. An assembly comprising a handling device, a tool-carriage cylindrical electric spindle and a cylindrical support of a machine tool, wherein said handling device comprises a handling cradle comprising:

a support bed in which the electric spindle is positioned;

a gripping device configured to ensure lifting of said handling cradle; and a fixation mechanism configured to fix said handling cradle to the cylindrical support so that the electric spindle faces the cylindrical support, wherein said fixation mechanism is situated at the front end of said handling cradle and comprises an arc portion of a cylindrical tube having its outside diameter matched to the inside diameter of the cylindrical support so as to be coaxial therewith, and having an inside diameter larger than the diameter of the rear of the electric spindle.

2. An assembly according to claim 1, wherein said gripping device comprises a shackle, one end of which is situated at the level of the center of gravity of the handling cradle and fixed to one of the sides of the support bed, and the other end of which is preformed to receive a hooking device of a lifting machine.

3. An assembly according to claim 1, wherein said support bed comprises a channel iron, the edges of which are chamfered in order to permit good seating of the electric spindle in the handling cradle and sliding of the electric spindle.

4. An assembly according to claim 1, wherein:

said electric spindle comprises a shoulder at its front end, and said support bed comprises an adjusting shim situated on the median longitudinal axis of the support bed, close to the fixation mechanism, the electric spindle resting on the adjusting shim in such a way as to keep said electric spindle horizontal, said electric spindle resting at the rear end of the support bed via said shoulder.

5. An assembly according to claim 1, wherein said support bed comprises an axial blocking device configured to block said electric spindle in said support bed, thereby preventing translational movement of the electric spindle along its axis.

6. An assembly according to claim 5, wherein said axial blocking device comprises a groove perpendicular to the axis of sliding of the electric spindle on said support bed, the width of said groove being sufficient to accommodate a shoulder of the electric spindle and the depth being sufficient to permit said shoulder to remain in contact with chamfered edges of said support bed.

7. An assembly according to claim 5, wherein said axial blocking device is a blocking shim grooved perpendicular to said axis of the electric spindle and is situated on the median longitudinal axis of the support bed such that, when a shoulder of the electric spindle is engaged in said groove, the rear of the electric spindle bears on said adjusting shim without being inserted in said cylindrical support.

8. An assembly according to claim 1, wherein:

said cylindrical support comprises a slide of a high-speed machine tool, said slide comprising three successive recessed shoulders forming collars, said successive recessed shoulders including a first exterior shoulder situated at an entrance to the slide, and defining an opening diameter larger than an opening diameter defined by an intermediate shoulder and an interior shoulder, and said adjusting shim is situated on the median longitudinal axis of the support bed in such a way that, during sliding of the electric spindle toward the slide, the shoulder of the electric spindle becomes abutted against said adjusting shim as soon as the rear of the electric spindle is inserted in the two intermediate and interior shoulders of said slide.

9. An assembly according to claim 8, wherein said arc portion of a cylindrical tube comprises at least two orifices along an axis parallel to the axis of the tube in order to permit the passage of fixation bolts for engagement in threaded holes drilled in said first exterior shoulder of the slide.

10. An assembly according to claim 1, wherein said fixation mechanism is disposed relative to the support bed such that, when the electric spindle is positioned on the support bed, the electric spindle is coaxial with the fixation mechanism.

11. An assembly according to claim 4, wherein said support bed comprises an axial blocking device configured to block said electric spindle in said support bed, thereby preventing transitional movement of the electric spindle along its axis.

12. An assembly according to claim 4, wherein:

said cylindrical support comprises a slide of a high-speed machine tool, said slide comprising three successive recessed shoulders forming collars, said successive recessed shoulders including a first exterior shoulder situated at an entrance to the slide, and defining an opening diameter larger than an opening diameter defined by an intermediate shoulder and an interior shoulder, and said adjusting shim is situated on the median longitudinal axis of the support bed in such a way that, during sliding of the electric spindle toward the slide, the shoulder of the electric spindle becomes abutted against said adjusting shim as soon as the rear of the electric spindle is inserted in the two intermediate and interior shoulders of said slide.

13. An assembly according to claim 2, wherein said fixation mechanism is disposed relative to the support bed such that, when the electric spindle is positioned on the support bed, the electric spindle is coaxial with the fixation mechanism.

14. An assembly according to claim 3, wherein said fixation mechanism is disposed relative to the support bed such that, when the electric spindle is positioned on the support bed, the electric spindle is coaxial with the fixation mechanism.

15. An assembly according to claim 4, wherein said fixation mechanism is disposed relative to the support bed such that, when the electric spindle is positioned on the support bed, the electric spindle is coaxial with the fixation mechanism.

16. An assembly according to claim 5, wherein said fixation mechanism is disposed relative to the support bed such that, when the electric spindle is positioned on the support bed, the electric spindle is coaxial with the fixation mechanism.

17. An assembly according to claim 6, wherein said fixation mechanism is disposed relative to the support bed such that, when the electric spindle is positioned on the support bed, the electric spindle is coaxial with the fixation mechanism.

18. An assembly according to claim 7, wherein said fixation mechanism is disposed relative to the support bed such that, when the electric spindle is positioned on the support bed, the electric spindle is coaxial with the fixation mechanism.

19. An assembly according to claim 8, wherein said fixation mechanism is disposed relative to the support bed such that, when the electric spindle is positioned on the support bed, the electric spindle is coaxial with the fixation mechanism.

20. An assembly according to claim 9, wherein said fixation mechanism is disposed relative to the support bed such that, when the electric spindle is positioned on the support bed, the electric spindle is coaxial with the fixation mechanism.

* * * * *